United States Patent
Michlin et al.

(10) Patent No.: US 8,555,382 B2
(45) Date of Patent: Oct. 8, 2013

(54) METHOD AND SYSTEM FOR AUTOMATIC INVARIANT BYTE SEQUENCE DISCOVERY FOR GENERIC DETECTION

(75) Inventors: Irene Michlin, Wendover (GB); Anthony Vaughan Bartram, Milton Keynes (GB)

(73) Assignee: McAfee, Inc., Santa Clara, CA (US)

( * ) Notice: Subject to any disclaimer, the term of this patent is extended or adjusted under 35 U.S.C. 154(b) by 570 days.

(21) Appl. No.: 12/820,717

(22) Filed: Jun. 22, 2010

(65) Prior Publication Data

US 2011/0314545 A1   Dec. 22, 2011

(51) Int. Cl.
*G06F 11/00* (2006.01)
(52) U.S. Cl.
USPC .................................................. 726/22
(58) Field of Classification Search
USPC ................. 726/22, 23, 24; 713/150–181; 380/200–242
See application file for complete search history.

(56) References Cited

U.S. PATENT DOCUMENTS

| | | | | |
|---|---|---|---|---|
| 5,452,442 | A * | 9/1995 | Kephart | 714/38.1 |
| 6,473,800 | B1 * | 10/2002 | Jerger et al. | 709/226 |
| 8,151,117 | B2 * | 4/2012 | Hicks | 713/187 |
| 2010/0166007 | A1 * | 7/2010 | Horner | 370/458 |

* cited by examiner

*Primary Examiner* — Kambiz Zand
*Assistant Examiner* — Abiy Getachew
(74) *Attorney, Agent, or Firm* — Baker Botts L.L.P.

(57) ABSTRACT

A method for creating a set of genericized signatures for detection of byte sequences in computer code includes accessing a first set of sample signatures, determining a maximum number of wildcards that a wildcarded signature may comprise, determining a first wildcarded signature corresponding to the first set of sample signatures, evaluating the first wildcarded signature, and repeating the steps of evaluating for any second wildcarded signatures. Each of the signatures corresponds to an instance of malware. The evaluation further includes if the number of wildcards in the first wildcarded signature exceeds the maximum number of wildcards, determining a plurality of second wildcarded signatures corresponding to a plurality of subsets of the set of sample signatures. The evaluation further includes if the number of wildcards in the first wildcarded signature is less than or equal to the maximum number of wildcards, adding the first wildcarded signature to a set of genericized signatures.

26 Claims, 5 Drawing Sheets

METHOD AND SYSTEM FOR AUTOMATIC INVARIANT BYTE SEQUENCE DISCOVERY FOR GENERIC DETECTION

TECHNICAL FIELD OF THE INVENTION

The present invention relates generally to computer security and malware protection and, more particularly, to a method and system for automatic invariant byte sequence discovery for generic detection.

BACKGROUND

Malware infections may be detected through the use of signatures, which antivirus applications may use to match against portions of suspected malware running on electronic devices. The signatures may make use of hash methods to expedite the detection of malware. However, some malware may be polymorphic, contain variable data or instructions, or otherwise function such that a hash operation upon different instances of the same malware may yield different results. Thus, individual kinds of malware may require many different signatures to adequately detect all variations of the malware, wherein the signatures may use comparisons of byte sequences.

Malware may include, but is not limited to, spyware, rootkits, password stealers, spam, sources of phishing attacks, sources of denial-of-service-attacks, viruses, loggers, Trojans, adware, or any other digital content that produces unwanted activity.

SUMMARY

A method for creating a set of genericized signatures for detection of byte sequences in computer code includes accessing a first set of sample signatures, determining a maximum number of wildcards that a wildcarded signature may comprise, determining a first wildcarded signature corresponding to the first set of sample signatures, evaluating the first wildcarded signature, and repeating the steps of evaluating for any second wildcarded signatures. Each of the signatures corresponds to an instance of malware. The evaluation further includes if the number of wildcards in the first wildcarded signature exceeds the maximum number of wildcards, determining a plurality of second wildcarded signatures corresponding to a plurality of subsets of the set of sample signatures. The evaluation further includes if the number of wildcards in the first wildcarded signature is less than or equal to the maximum number of wildcards, adding the first wildcarded signature to a set of genericized signatures.

In a further embodiment, an article of manufacture includes a computer readable medium and computer-executable instructions. The computer-executable instructions are carried on the computer readable medium. The instructions are readable by a processor. The instructions, when read and executed, cause the processor to create a set of genericized signatures for detection of byte sequences in computer code, access a first set of sample signatures, each of the signatures corresponding to an instance of malware, determine a maximum number of wildcards that a wildcarded signature may comprise, determine a first wildcarded signature corresponding to the first set of sample signatures, evaluate the first wildcarded signature, and repeat the steps of evaluation for any second wildcarded signatures. Causing the processor to evaluate the first wildcarded signature includes if the number of wildcards in the first wildcarded signature exceeds the maximum number of wildcards, determine a plurality of second wildcarded signatures corresponding to a plurality of subsets of the set of sample signatures, and if the number of wildcards in the first wildcarded signature is less than or equal to the maximum number of wildcards, add the first wildcarded signature to the set of genericized signatures.

In yet another embodiment, a system for detecting malware includes a processor, a computer readable medium, and computer-executable instructions carried on the computer readable medium. The instructions, when read and executed, cause the processor create a set of genericized signatures for detection of byte sequences in computer code, access a first set of sample signatures, each of the signatures corresponding to an instance of malware, determine a maximum number of wildcards that a wildcarded signature may comprise, determine a first wildcarded signature corresponding to the first set of sample signatures, evaluate the first wildcarded signature, and repeat the steps of evaluation for any second wildcarded signature. The evaluation includes causing the processor to if the number of wildcards in the first wildcarded signature exceeds the maximum number of wildcards, determine a plurality of second wildcarded signatures corresponding to a plurality of subsets of the set of sample signatures, and, if the number of wildcards in the first wildcarded signature is less than or equal to the maximum number of wildcards, add the first wildcarded signature to the set of genericized signatures.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
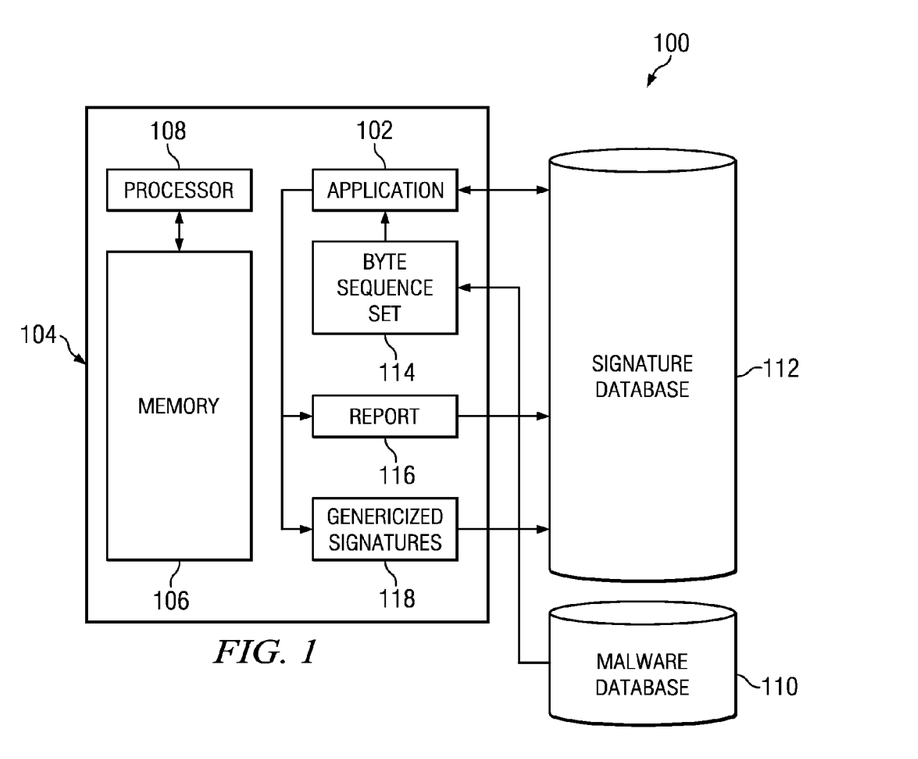
FIG. 1 is an illustration of an example system for automatically discovering invariant byte sequences for generic malware detections.

FIG. 1 is an illustration of an example system 100 for automatically discovering invariant byte sequences for generic malware detections. System 100 may comprise an application 102 running on electronic device 104. Application 102 may be configured to determine, from a byte sequence set 114, one or more genericized signatures 118 and generate a report 116. Application may be coupled to a malware database 110. Malware database 110 may be configured to store and provide access to samples of malware. Application may be coupled to a signature database 112. Signature database 112 may be configured to store and provide access to signatures for detecting malware.

Application 102 may comprise an application, process, script, module, executable, server, executable object, library, or any other digital entity suitable for automatically discovering invariant byte sequences for generic malware detections. Application 102 may reside on electronic device 104.

Antivirus application 102 may be configured to reside in memory 106 for execution by processor 108 with instructions contained in memory 106.

Electronic device 104 may comprise any device configurable to interpret and/or execute program instructions and/or process data, including but not limited to: a computer, desktop, server, laptop, personal data assistant, or smartphone. Electronic device 104 may comprise a processor 108 coupled to a memory 106. Electronic device 104 may comprise a memory 106 coupled to a processor 108.

Processor 108 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 108 may interpret and/or execute program instructions and/or process data stored in memory 106. Memory 106 may be configured in part or whole as application memory, system memory, or both. Memory 106 may include any system, device, or apparatus configured to hold and/or house one or more memory modules. Each memory module may include any system, device or apparatus configured to retain program instructions and/or data for a period of time (e.g., computer-readable media).

Malware database 110 may be configured to store and provide access to information about malware. In one embodiment, malware database 110 may comprise information regarding malware samples. Such malware samples may be stored in any suitable format. In one embodiment, malware samples may comprise a the result of executing a hash process on malware. Malware database 110 may be implemented in any suitable way to adequately provide information to application 102 concerning data associated with malware, including but not limited to: a database, file, record, server, functional library, or module.

Signature database 112 may be configured to store and provide access to information about signatures for use in detecting malware. Signature database 112 may be implemented in any suitable way to store signatures, including but not limited to: a database, file, record, server, functional library, or module.

Application 102 may be configured to access a byte sequence set 114. Byte sequence set 114 may include a plurality of byte sequences. Each of the byte sequences in byte sequence set 114 may be of the same length. Byte sequence set 114 may comprise information associated with malware. In one embodiment, byte sequence set 114 may comprise information associated with a plurality of samples that have been determined as possibly related to each other. In such an embodiment, each of the byte sequences in byte sequence set 114 may be associated with a separate sample. Byte sequence set 114 may comprise information stored in malware database 110. Byte sequence set 114 may be implemented in any suitable way for implementing information associated with a plurality of malware, such as a record, file, or array of data structures. In one embodiment, byte sequence set 114 may comprise the results of hashing malware samples. In such an embodiment, byte sequence set 114 may comprise a set of signatures, each signature representing an instance of malware. In another embodiment, byte sequence set 114 may comprise code or data from malware samples. Application 102 may be communicatively coupled to malware database 110. In one embodiment, byte sequence set 114 may be received electronic device 104 or application 102 from malware database 110. In another embodiment, byte sequence set 114 may reside within malware database 110 and be retrieved by application 102.

Application 102 may be configured to use the information in byte sequence set 114 as source information to generate one or more genericized signatures 118. Application 102 may be configured to discover groups of invariant sequences of bytes from within the malware samples, determine particular fields as wildcards, and subsequently generate genericized signatures 118. The resulting invariant sequences of bytes may describe portions of malware samples that have the same pattern of values in the same locations. An invariant sequence of bytes, in combination with a wildcard variable, may adequately identify a set of malware samples that have certain invariant sequences of bytes in common, but different bytes where noted by wildcard variables. In one embodiment, application 102 may be configured to utilize operating parameters to determine a maximum of how many genericized signatures 118 may be created in processing byte sequence set 114. In another embodiment, application 102 may be configured to utilize operating parameters to determine a maximum number of wildcards that a given genericized signature 118 may possess.

Genericized signatures 118 may comprise signatures for detecting malware. In one embodiment, byte sequence set 114 may comprise digital hashes of portions of malware. In such an embodiment, genericized signatures 118 may comprise digital hashes of portions of malware. Genericized signatures 118 may comprise a file signature, hash, or any other suitable mechanism configured to determine whether a particular digital entity, such as a file, object code, or shared library, can be identified as malware similar to one or more of the malware from which byte sequence set 114 was taken. Genericized signatures 118 may comprise a combination of one or more of detected invariant byte sequences, wildcards, logic, rules, and/or instructions for detecting malware in a particular way.

Signature database 112 may be communicatively coupled to application 102. Signature database 112 may be configured to store the result of application 102 generating one or more genericized signatures 118.

Application 102 may be configured to generate a report 116 based on the results of attempting to create signatures from byte sequence set 114. Depending upon the input data, as well as operating parameters, application 102 may or may not be successful in creating genericized signatures 118. Report 116 may comprise information regarding the input, parameters, and results of attempting to generate genericized signatures 118 under the specified parameters. In one embodiment, report 116 may be configured to be accessed via a user of application 102. In another embodiment, report 116 may be configured to be stored in a database, memory, or other suitable location. In such an embodiment, report 116 may be stored in signature database 112.

Figure 2:
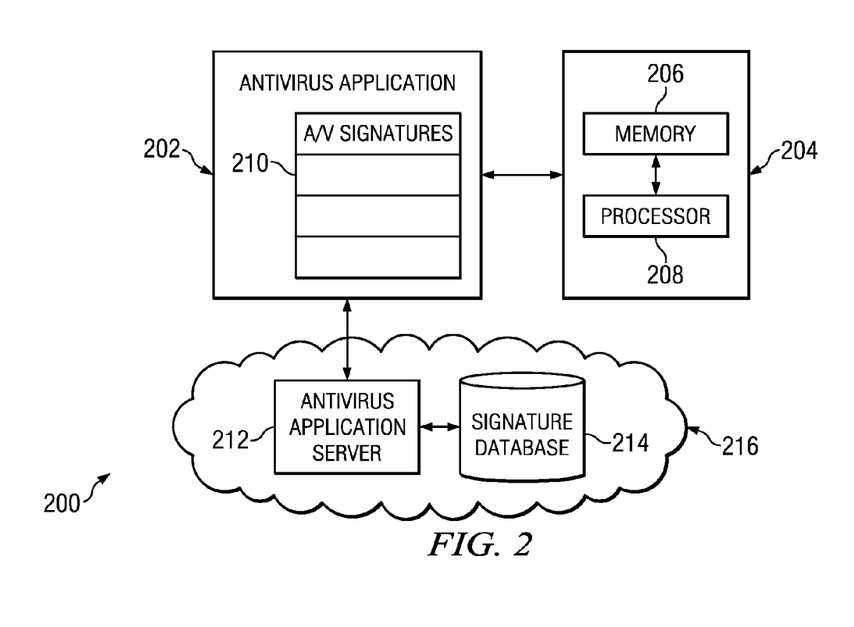
FIG. 2 is an illustration of an example system for using a signature generated by discovering invariant byte sequences for generic malware detections on an electronic device.

FIG. 2 is an illustration of an example system 200 for using a signature generated by discovering invariant byte sequences for generic malware detections on an electronic device. An antivirus application 202 may be configured to scan a client 204 for malware. Antivirus application 202 may be communicatively coupled to an antivirus application server 212 to receive updated information regarding malware. Antivirus application 202 may be communicatively coupled to server resources such as a signature database 214 to access information regarding malware.

Client 204 may comprise an electronic device. Client 204 may comprise any device configurable to interpret and/or execute program instructions and/or process data, including but not limited to: a computer, desktop, server, laptop, personal data assistant, or smartphone. Client 204 may comprise a processor 208 coupled to a memory 206.

Processor 208 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 108 may interpret and/or execute program instructions and/or process data stored in memory 106. Memory 206 may be configured in part or whole as application memory, system memory, or both. Memory 206 may include any system, device, or apparatus configured to hold and/or house one or more memory modules. Each memory module may include any system, device or apparatus configured to retain program instructions and/or data for a period of time (e.g., computer-readable media).

Antivirus application 202 may comprise any application, process, script, module, executable, server, executable object, library, or other suitable digital entity. Antivirus application 202 may be configured to reside in memory 206 for execution by processor 208 with instructions contained in memory 206. Antivirus application 202 may comprise an antivirus engine, operable to provide logic, rules, scripts, and/or instructions to antivirus application 202 to detect malware. Antivirus application 202 may comprise one or more antivirus signatures 210, each signature comprising a set of logic, rules, scripts, byte sequence, and/or instructions for detecting malware in a particular way. Each of antivirus signatures 210 may comprise file signatures, hashes, or any suitable mechanism to identify whether a entity within client 204 is malware.

In one embodiment, antivirus application 202 may be configured to operate in a cloud computing scheme. Antivirus application 202 may comprise software or instructions that resides on a network, and may be loaded and executed on a machine on the network. In such an embodiment, antivirus application 202 may be communicatively coupled to client 204 through the network. Antivirus application 202 may scan client 204 without executing on client 204.

In one embodiment, antivirus application 202 may reside on client 204. Antivirus application 202 may be loaded and executed on client 204. In another embodiment, portions of antivirus application 202 may reside on client 204, and other portions of antivirus application 202 may reside on another machine communicatively coupled to client 204.

Antivirus application server 212 may be communicatively coupled to antivirus application 202 through network 216. Network 216 may be implemented in any way suitable for antivirus application server 212 and antivirus application 202 to communicate with each other. Network 216 may comprise, for example, all or portions of a local area network, a wide area network, an intranet, or the Internet.

Antivirus application server 212 may be configured to provide updates to antivirus application 202, and receive reports from antivirus application 202. In one embodiment, antivirus application server 212 may be configured to provide new or updated antivirus signatures to antivirus application 202. Antivirus application 202 may be configured to apply the signatures received to its scanning of client 204 by adding the signatures to antivirus signatures 210. Antivirus application server 212 may be configured to access information for updates by accessing signature database 214. In one embodiment, signature database 214 may be implemented fully or in part by the signature database 112 of FIG. 1.

In operation, application 102 may access malware database 110 to obtain byte sequence set 114. Byte sequence set 114 may have been created by determining that a plurality of malware samples were suspicious, or possibly related to each other. In one embodiment, byte sequence set 114 may be created by performing a hash method on a portable executable resource. In such an embodiment, the results of the hash may include, for example, a display coordinate of the resource, a resource count, or a checksum, or more than one result of a hash function combined in any suitable manner. In such an embodiment, hashes of samples that may be infected by the same malware may yield slightly different hashes. Thus, any given hash may not adequately describe the full range of possible results from applying a hash to multiple samples of the same malware.

For example, byte sequence set 114 may be of the form and content as shown in Table 1.

TABLE 1

Example Byte Sequence Set

| Position 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| {0x03, | 0x91, | 0x00, | 0x00, | 0x5c, | 0x00, | 0xf0, | 0x00, | 0x00, | 0x00, | 0x31, | 0x31, | 0x02, | 0x00, | 0x00, | 0x02}, |
| {0x03, | 0x92, | 0x00, | 0x00, | 0x13, | 0x00, | 0x60, | 0x00, | 0x10, | 0x00, | 0x33, | 0x33, | 0x02, | 0x16, | 0x00, | 0x22}, |
| {0x03, | 0x92, | 0x00, | 0x00, | 0x1a, | 0x00, | 0x80, | 0x00, | 0x10, | 0x00, | 0x33, | 0x33, | 0x02, | 0x16, | 0x00, | 0x20}, |
| {0x03, | 0x92, | 0x00, | 0x00, | 0x3a, | 0x00, | 0xd0, | 0x00, | 0x10, | 0x00, | 0x33, | 0x33, | 0x02, | 0x20, | 0x00, | 0x03}, |
| {0x03, | 0x92, | 0x00, | 0x00, | 0x43, | 0x00, | 0xb0, | 0x00, | 0x10, | 0x00, | 0x31, | 0x31, | 0x02, | 0x00, | 0x00, | 0x03}, |
| {0x03, | 0x92, | 0x00, | 0x00, | 0x53, | 0x00, | 0xb0, | 0x00, | 0x10, | 0x00, | 0x31, | 0x11, | 0x02, | 0x00, | 0x00, | 0x03}, |
| {0x03, | 0x92, | 0x00, | 0x00, | 0x60, | 0x00, | 0x40, | 0x01, | 0x10, | 0x00, | 0x33, | 0x33, | 0x02, | 0x6c, | 0x00, | 0x0b}, |
| {0x03, | 0x92, | 0x00, | 0x00, | 0x62, | 0x01, | 0x90, | 0x02, | 0x10, | 0x00, | 0x33, | 0x33, | 0x02, | 0x10, | 0x00, | 0x03}, |
| {0x03, | 0x92, | 0x00, | 0x00, | 0xcb, | 0x00, | 0x60, | 0x02, | 0x10, | 0x00, | 0x33, | 0x33, | 0x02, | 0x10, | 0x00, | 0x03}, |
| {0x03, | 0x92, | 0x00, | 0x00, | 0xe5, | 0x01, | 0xe0, | 0x04, | 0x10, | 0x00, | 0x33, | 0x33, | 0x02, | 0x40, | 0x00, | 0x03}, |
| {0x03, | 0x92, | 0x01, | 0x00, | 0x3a, | 0x00, | 0x20, | 0x00, | 0x01, | 0x00, | 0x33, | 0x31, | 0x04, | 0x20, | 0x00, | 0x03}, |
| {0x03, | 0x92, | 0x03, | 0x00, | 0x60, | 0x00, | 0x20, | 0x00, | 0x01, | 0x00, | 0x33, | 0x31, | 0x02, | 0x70, | 0x00, | 0x03}, |
| {0x03, | 0x92, | 0x06, | 0x00, | 0x68, | 0x00, | 0x10, | 0x00, | 0x01, | 0x00, | 0x31, | 0x12, | 0x04, | 0x04, | 0x00, | 0x03}, |
| {0x03, | 0x92, | 0x08, | 0x00, | 0x84, | 0x00, | 0x10, | 0x00, | 0x01, | 0x00, | 0x3b, | 0x3b, | 0x02, | 0xe0, | 0x00, | 0x22}, |
| {0x03, | 0x92, | 0x0a, | 0x00, | 0x4a, | 0x01, | 0x20, | 0x00, | 0x01, | 0x00, | 0x33, | 0x31, | 0x04, | 0x28, | 0x00, | 0x0a}, |
| {0x03, | 0x93, | 0x00, | 0x00, | 0x06, | 0x01, | 0x90, | 0x01, | 0x10, | 0x00, | 0x32, | 0x32, | 0x10, | 0x10, | 0x90, | 0x22}, |
| {0x03, | 0x93, | 0x00, | 0x00, | 0x14, | 0x00, | 0x50, | 0x00, | 0x10, | 0x00, | 0x32, | 0x32, | 0x10, | 0x10, | 0x50, | 0x03}, |
| {0x03, | 0x93, | 0x00, | 0x00, | 0x16, | 0x01, | 0x10, | 0x04, | 0x10, | 0x00, | 0x32, | 0x32, | 0x10, | 0x10, | 0x10, | 0x07}, |
| {0x03, | 0x93, | 0x00, | 0x00, | 0x18, | 0x00, | 0x50, | 0x00, | 0x10, | 0x00, | 0x32, | 0x32, | 0x10, | 0x10, | 0x50, | 0x03}, |
| {0x03, | 0x93, | 0x00, | 0x00, | 0x18, | 0x00, | 0x60, | 0x00, | 0x20, | 0x00, | 0x32, | 0x32, | 0x10, | 0x20, | 0x60, | 0x03}, |
| {0x03, | 0x93, | 0x00, | 0x00, | 0x1a, | 0x00, | 0xb0, | 0x00, | 0x10, | 0x00, | 0x32, | 0x32, | 0x10, | 0x10, | 0xb0, | 0x03}, |
| {0x03, | 0x93, | 0x00, | 0x00, | 0x1c, | 0x00, | 0x90, | 0x00, | 0x10, | 0x00, | 0x32, | 0x32, | 0x10, | 0x10, | 0x90, | 0x22}, |
| {0x03, | 0x93, | 0x00, | 0x00, | 0x1d, | 0x00, | 0xb0, | 0x00, | 0x10, | 0x00, | 0x33, | 0x33, | 0x02, | 0x72, | 0x41, | 0x0a}, |
| {0x03, | 0x93, | 0x00, | 0x00, | 0x23, | 0x01, | 0x80, | 0x03, | 0x10, | 0x00, | 0x33, | 0x33, | 0x02, | 0x72, | 0x41, | 0x03}, |
| {0x03, | 0x93, | 0x00, | 0x00, | 0x30, | 0x00, | 0x20, | 0x01, | 0x10, | 0x00, | 0x32, | 0x32, | 0x10, | 0x10, | 0x20, | 0x22}, |

TABLE 1-continued

Example Byte Sequence Set

{0x03, 0x93, 0x00, 0x00, 0x36, 0x00, 0x70, 0x00, 0x10, 0x00, 0x32, 0x32, 0x10, 0x10, 0x70, 0x03},
{0x03, 0x93, 0x00, 0x00, 0x3c, 0x00, 0x90, 0x00, 0x10, 0x00, 0x32, 0x32, 0x10, 0x10, 0x90, 0x22},
{0x03, 0x93, 0x00, 0x00, 0x3f, 0x00, 0xb0, 0x00, 0x10, 0x00, 0x33, 0x33, 0x02, 0x72, 0x41, 0x03},
{0x03, 0x93, 0x00, 0x00, 0x42, 0x01, 0x90, 0x02, 0x10, 0x00, 0x32, 0x32, 0x10, 0x30, 0x90, 0x22}
}

The byte sequences of Table 1 may comprise signatures for detection of malware.

After receiving or accessing byte sequence set 114, application 102 may utilize operating parameters to determine how many and of what form genericized signatures 118 may be created as a result of processing byte sequence set 114. Application 102 may generate report 116 based on the success or failure of processing byte sequence set 114 into genericized signatures 118 under the specified operating parameters. Any suitable operating parameters may be selected by application 102 for the efficient determination of effective and accurate genericized signatures 118. In one embodiment, the maximum number of different signatures to be generated based upon byte sequence set 114 may be set as "N." In another embodiment, the maximum number of different wildcard variables within a given genericized signature may be set application 102 as "X." The choice of operating parameters may depend upon the particular application of the present invention.

In one embodiment, "N" may be necessary to limit the number of generated genericized signatures 118 to make the scanning of a system with genericized signatures efficient. For example, if each sequence of byte sequence set 114 resulted in an individualized signature, the application of such a large number of signatures in a system such as system 200 may be inefficient, as antivirus application 202 would be scanning client 204 for code segments corresponding to any of a very large number of different signatures. The selection of a particular value of "N" may depend upon the size of the samples to be processed, and how effectively the samples were pre-screened to determine some likelihood that the samples may comprise the same malware. In one embodiment, "N" may be selected as 25% of the number of sets in byte sequence set 114. As "N" is increased, the number of generated signatures may increase and negatively affect performance of antivirus application 202, or another application using genericized signatures 118. "N" may be selected so as to balance the negative impact on performance with a greater likelihood of finding genericized signatures 118 to cover byte sequence set 114. The selection of "N" may take into account the size of byte sequence set 114, the degree to which the samples associated byte sequence set 114 were screened for suspicion of similarity, the severity of the malware to be detected, the performance degradation or improvement of an application such as antivirus application 202, and the costs and difficulty of updating an application such as antivirus application 202. A larger size of byte sequence set 114 may require a larger selection of "N," in either absolute terms or in percentage terms, because more samples increases the chance that samples unrelated to each other will be processed. Any number of factors or techniques may be used to determine that some of the samples associated with byte sequence set 114 may be of the same type of malware, including rudimentary byte sequence analysis, Jaccardian distance, operational code indexing, or similar behavior. The degree to which the samples associated with byte sequence set 114 were already determined to be suspiciously similar to each other may be inversely proportional to the required selection of "N." For example, a byte sequence set 114 created from completely random samples of suspected malware may have very few invariant byte sequences in common, and thus an associated complete set of genericized signatures 118 may be quite large. However, application 102 processing a byte sequence set 114 created from samples of suspected malware with various indications that some of the suspected malware may yield a much smaller set of genericized signatures 118. Thus, selecting a value for "N" may take into account the nature of the samples used to generate byte sequence set 114 to generate an appropriate set of genericized signatures 118. The selection of "N" may also take into account past operations of application 202, whether they were successful or unsuccessful, the parameters associated with such operations, and the similar size or nature of byte sequence sets used with such operations. In one embodiment, application 202 may unsuccessfully attempt to generate genericized signatures 118 for a particular value of "N" for a given byte sequence set 114; application 202 may subsequently attempt to generate genericized signatures 118 for a larger value of "N."

In another embodiment, "X" may be necessary to limit the number of wildcards in a signature to limit false positive matches. Without a limit such as "X," a signature consisting of too many wildcards may cause false positive matches, as such, a signature would cover many sets of byte sequence set 114. The selection of a particular value of "X" may depend upon the size and number of the samples to be processed, how effectively the samples were pre-screened to determine some likelihood that the samples may comprise the same malware, and the kind of hashes that were performed upon malware samples. In one embodiment, "X" may be selected allowing four wildcards in a sixteen-byte signature. To determine an appropriate value of "X," the impact of additional wildcards upon the collision resistance of a hash function used upon the original samples may be considered. For a given hash function, the collision resistance may be calculated, indicating the probability that given two different inputs, application of the hash function will result in the same result. Selection of hash functions and hash function parameters may be made according to a measure of the collision resistance. Adding wildcards to portions of the signature may increase the chances of collisions, thus decreasing collision resistance. However, adding wildcards may also increase the ability of a signature to identify additional pieces of malware. Thus, the value of "X" may be selected by increasing its value to the highest level under which collision resistance remains acceptably high.

In one embodiment, selections of "N" and "X" may vary according to each other. For example, a decrease in the number of signatures that may be created for a given byte sequence set 114 may be possible through a increase in the number of wildcards allowed, or vice-versa. Application 102 may vary "N" and "X" in successive attempts to create genericized signatures 118 from byte sequence set 114, depending upon the results of a previous attempt. For example, if an attempt to create genericized signatures 118 from byte sequence set 114 fails because too many signatures were created, application 102 may increase the number of wildcards available for a given signature to utilize, checking to see if collision resistance remains acceptably high, and reattempting to create genericized signatures 118 from the same byte sequence set 114 with the new parameters.

To determine how many and of what form genericized signatures 118 may be created as a result of processing byte sequence set 114, application 102 may analyze processing byte sequence set 114 to find invariant byte sequences. Application 102 may analyze subsets of byte sequence set 114 at a time, beginning with the full byte sequence set 114. Application 102 may create wildcarded signatures that represent a subset of byte sequence set 114, comprising invariant bytes—representing values in common between sequences of the subset—and wildcards—representing values that vary between the sequences of the subset. Application 102 may then evaluate whether the wildcarded signature meets the required operational parameters, for example, "N" and "X." Application 102 may determine whether the creation of the wildcarded signature, if it were determined to be a successfully created signature to be added to genericized signatures 118, would cause the total number of signatures created to exceed the maximum number of signatures to be created, such as parameter "N." If it has, then the processing of byte sequence set 114 has failed. If it has not, then application 102 may continue. Application 102 may determine whether the created wildcarded signature includes too many wildcards to be an acceptable signature under the maximum number of wildcards, such as parameter "X." If the wildcarded signature representing the subset has an acceptable number of wildcards, then application 102 may accept the wildcarded signature as a valid signature that adequately represents all of the subsequences in the subset, and add the signature to a list of accepted signatures to be added to genericized signatures 118. If not, application 102 may further process the subset to determine a combination of signatures that may adequately represent all of the subsequences in the subset.

In order to create a wildcarded signature for a subset of byte sequence set 114, application 102 may determine for a subset of byte sequence set 114 what values each sequence has in common with each other sequence at a given position in the sequence. These values in common may be determined to be invariant for the subset. The positions corresponding to the invariant values may be set by application 102. The remaining positions may be determined by application 102 to be wildcards. For example, for the data set in Table 1, starting with the complete data set, application 102 may determine that all values in position 1 are of the value 0x03, all values in position 4 are of the value 0x00, and all values in position 10 are of the value 0x00. Thus, all resulting signatures from this set of subsequences may have these values in their respective positions. The remainder of the positions in the may be represented in a wildcarded signature by wildcards, represented in the present disclosure by "xx." Thus, a wildcarded signature for the entire sequence set of Table 1 may be represented as:

{0x03, xx, xx, 0x00, xx, xx, xx, xx, xx, 0x00, xx, xx, xx, xx, xx, xx}

In such an example, the total created wildcarded signatures is 1. Assuming that the total number of signatures allowed, N, is fourteen, application 102 may continue to process the byte sequence set 114. In such an example, the signature representing the byte sequence set 114 contain thirteen wildcards. Assuming that the maximum wildcards allowed for a given signature, X, is six, application 102 may determine that the present signature is not acceptable to represent byte sequence set 114, and application 102 may continue to process the wildcarded signature.

To continue processing a wildcarded signature, the subset of byte sequence set 114 represented by the wildcarded signature may be divided by application 102 into additional subsets, and each subset analyzed according to the process described above. The subset of byte sequence set 114 may be divided by application 102 into additional subsets in any way that may further determine invariant byte sequences under the operational parameters. In one embodiment, the subset of byte sequence set 114 to be further processed may be divided by application 102 into two or more subsets, the two or more subsets to be processed into wildcarded signatures to be analyzed under the operational parameters. In such an embodiment, a subset of byte sequence set 114 may be divided by application 102 into additional subsets chosen according to the least additional variation between positions in each subsequence in the subset. For example, application 102 may determine, for a given position in the sequences of the subset, how many different values are present in different subsequence in the position. Application 102 may thus determine which of the positions in the sequences have the least variation. Application 102 may select the position as the basis for generating additional subsets, with wildcarded signatures to be generated for each such subset and subsequently analyzed.

In the example of the byte sequence set in Table 1, after processing the data into the wildcarded signature {0x03, xx, xx, 0x00, xx, xx, xx, xx, xx, 0x00, xx, xx, xx, xx, xx, xx} which contains too many wildcards to be a valid signature, application 102 may analyze the variance between the positions in the byte sequence set of Table 1. Application 102 may thus determine that position 2 contains the least number of different values of the remaining wildcarded positions, in that position 2 is either 0x91 (one sequence), 0x92 (fourteen sequences), or 0x93 (fourteen sequences).

Application 102 may divide the subset of byte sequence set 114 into further subsets based upon the different values of the subset sequences in the position with the least variation. Any suitable division of the subset into further subsets may be made by application 102. In one embodiment, application 102 may divide the subset of byte sequence set 114 into further subsets for each of the different values for the position with the least variation. In another embodiment, application 102 may divide the subset of byte sequence set 114 into a further subset for each of the two different values corresponding to the smallest number of sequences in the subset, and into a further subset representing the remainder of the different values for the position with the least variation. In such an embodiment, if two or more values correspond to the same number of sequences in the subset, either value may be chosen by application 102 to create a further subset. A wildcarded signature for each of the further subsets may be created by application 102, and the further subset and wildcarded signature may be processed in the manner described thus far. In one embodiment, the further subsets corresponding to the values associated with the least number of sequences in the previous subset may be processed and analyzed first by application 102.

In the example of the byte sequence set of Table 1, which has been identified as having three further subsets based on differing values at position 2, three subsets may be created by application 102 as shown in Table 2:

TABLE 2

Example Byte Sequence Set Divided into Three Subsets

Position
1   2   3   4   5   6   7   8   9   10  11  12  13  14  15  16

Subset 1 (Position 2 = 0x91):
{
{0x03, 0x91, 0x00, 0x00, 0x5c, 0x00, 0xf0, 0x00, 0x00, 0x00, 0x31, 0x31, 0x02, 0x00, 0x00, 0x02}
}
Subset 2 (Position 2 = 0x92):
{
{0x03, 0x92, 0x00, 0x00, 0x13, 0x00, 0x60, 0x00, 0x10, 0x00, 0x33, 0x33, 0x02, 0x16, 0x00, 0x22},
{0x03, 0x92, 0x00, 0x00, 0x1a, 0x00, 0x80, 0x00, 0x10, 0x00, 0x33, 0x33, 0x02, 0x16, 0x00, 0x20}
{0x03, 0x92, 0x00, 0x00, 0x3a, 0x00, 0xd0, 0x00, 0x10, 0x00, 0x33, 0x33, 0x02, 0x20, 0x00, 0x03},
{0x03, 0x92, 0x00, 0x00, 0x43, 0x00, 0xb0, 0x00, 0x10, 0x00, 0x31, 0x31, 0x02, 0x00, 0x00, 0x03},
{0x03, 0x92, 0x00, 0x00, 0x53, 0x00, 0xb0, 0x00, 0x10, 0x00, 0x31, 0x11, 0x02, 0x00, 0x00, 0x03},
{0x03, 0x92, 0x00, 0x00, 0x60, 0x00, 0x40, 0x01, 0x10, 0x00, 0x33, 0x33, 0x02, 0x6c, 0x00, 0x0b},
{0x03, 0x92, 0x00, 0x00, 0x62, 0x01, 0x90, 0x02, 0x10, 0x00, 0x33, 0x33, 0x02, 0x10, 0x00, 0x03},
{0x03, 0x92, 0x00, 0x00, 0xcb, 0x00, 0x60, 0x02, 0x10, 0x00, 0x33, 0x33, 0x02, 0x10, 0x00, 0x03},
{0x03, 0x92, 0x00, 0x00, 0xe5, 0x01, 0xe0, 0x04, 0x10, 0x00, 0x33, 0x33, 0x02, 0x40, 0x00, 0x03},
{0x03, 0x92, 0x01, 0x00, 0x3a, 0x00, 0x20, 0x00, 0x01, 0x00, 0x33, 0x31, 0x04, 0x20, 0x00, 0x03},
{0x03, 0x92, 0x03, 0x00, 0x60, 0x00, 0x20, 0x00, 0x01, 0x00, 0x33, 0x31, 0x02, 0x70, 0x00, 0x03},
{0x03, 0x92, 0x06, 0x00, 0x68, 0x00, 0x10, 0x00, 0x01, 0x00, 0x31, 0x12, 0x04, 0x04, 0x00, 0x03},
{0x03, 0x92, 0x08, 0x00, 0x84, 0x00, 0x10, 0x00, 0x01, 0x00, 0x3b, 0x3b, 0x02, 0xe0, 0x00, 0x22},
{0x03, 0x92, 0x0a, 0x00, 0x4a, 0x01, 0x20, 0x00, 0x01, 0x00, 0x33, 0x31, 0x04, 0x28, 0x00, 0x0a}
}
Subset 3 (Position 2 = 0x93):
{
{0x03, 0x93, 0x00, 0x00, 0x06, 0x01, 0x90, 0x01, 0x10, 0x00, 0x32, 0x32, 0x10, 0x10, 0x90, 0x22},
{0x03, 0x93, 0x00, 0x00, 0x14, 0x00, 0x50, 0x00, 0x10, 0x00, 0x32, 0x32, 0x10, 0x10, 0x50, 0x03},
{0x03, 0x93, 0x00, 0x00, 0x16, 0x01, 0x10, 0x04, 0x10, 0x00, 0x32, 0x32, 0x10, 0x10, 0x10, 0x07},
{0x03, 0x93, 0x00, 0x00, 0x18, 0x00, 0x50, 0x00, 0x10, 0x00, 0x32, 0x32, 0x10, 0x10, 0x50, 0x03},
{0x03, 0x93, 0x00, 0x00, 0x18, 0x00, 0x60, 0x00, 0x10, 0x00, 0x32, 0x32, 0x10, 0x20, 0x60, 0x03},
{0x03, 0x93, 0x00, 0x00, 0x1a, 0x00, 0xb0, 0x00, 0x10, 0x00, 0x32, 0x32, 0x10, 0x10, 0xb0, 0x03},
{0x03, 0x93, 0x00, 0x00, 0x1c, 0x00, 0x90, 0x00, 0x10, 0x00, 0x32, 0x32, 0x10, 0x10, 0x90, 0x22},
{0x03, 0x93, 0x00, 0x00, 0x1d, 0x00, 0xb0, 0x00, 0x10, 0x00, 0x33, 0x33, 0x02, 0x72, 0x41, 0x0a},
{0x03, 0x93, 0x00, 0x00, 0x23, 0x01, 0x80, 0x03, 0x10, 0x00, 0x33, 0x33, 0x02, 0x72, 0x41, 0x03},
{0x03, 0x93, 0x00, 0x00, 0x30, 0x00, 0x20, 0x01, 0x10, 0x00, 0x32, 0x32, 0x10, 0x10, 0x20, 0x22},
{0x03, 0x93, 0x00, 0x00, 0x36, 0x00, 0x70, 0x00, 0x10, 0x00, 0x32, 0x32, 0x10, 0x10, 0x70, 0x03},
{0x03, 0x93, 0x00, 0x00, 0x3c, 0x00, 0x90, 0x00, 0x10, 0x00, 0x32, 0x32, 0x10, 0x10, 0x90, 0x22},
{0x03, 0x93, 0x00, 0x00, 0x3f, 0x00, 0xb0, 0x00, 0x10, 0x00, 0x33, 0x33, 0x02, 0x72, 0x41, 0x03},
{0x03, 0x93, 0x00, 0x00, 0x42, 0x01, 0x90, 0x02, 0x10, 0x00, 0x32, 0x32, 0x10, 0x30, 0x90, 0x22}
}

Creation of a wildcarded signature by application 102 for each of the subsets may be as follows:
Subset 1: (0x03, 0x91, 0x00, 0x00, 0x5c, 0x00, 0xf0, 0x00, 0x00, 0x00, 0x31, 0x31, 0x02, 0x00, 0x00, 0x02}
Subset 2: (0x03, 0x92, xx, 0x00, xx, xx, xx, xx, xx, 0x00, xx, xx, xx, xx, 0x00, xx}
Subset 3: (0x03, 0x93, 0x00, 0x00, xx, xx, xx, xx, xx, 0x00, xx, xx, xx, xx, xx, xx}

As a consequence of this particular division of the sample byte sequence set, subset 3 has a single value for position 2 (0x93), and thus its invariant value may be represented in the wildcarded signature. However, as the division of a subset may require a division into four or more different values for a given position, the third subset may correspond to a signature with a wildcard in the given position.

In one embodiment, the two signatures corresponding to the smallest subsets may be selected by application 102 first for further processing. In the example above, the signatures corresponding to subset 1 and subset 2 (choosing subset 2 over subset 3, which have the same number of sequences) may thus be processed and analyzed by application 102.

For subset 1, a new signature has been created by application 102, which if successful would bring the total number of signatures created to 1, which is less than 14, the value of "N" selected for this example. The signature may be analyzed by application 102 according to the number of wildcards it contains. Since the subset was a single sequence, there are no variations between sequences for which a wildcard is needed. Thus, the number of wildcards in the wildcard signature is less than 6, the value of "X" selected for this example. Application 102 may store the signature in a list of accepted signatures, to be counted against the maximum "N" allowed. If the processing of the sample byte sequence set 114 is successful, application 102 will include this signature in the set of genericized signatures 118 to be used to cover the malware associated with byte sequence set 114.

For subset 2, a new signature has been created by application 102, bringing the total number of signatures created to 2, which is less than "N." The signature may be analyzed by application 102 according to the number of wildcards it contains. Since the subset contains eleven wildcards, which is more than the value of "X" selected for this example, the subset corresponding to the signature must be divided into further subsets, associated signatures created, and then the further subsets and signatures analyzed. In the case of subset 2, position 6 contains the least variation, for which all values in subset 2 are either 0x00 or 0x01. Thus, subset 2a, corresponding to 0x00 at position 6, and subset 2b, corresponding to 0x01 at position 6, may be created by application 102, as shown in Table 3:

TABLE 3

Subset 2 Divided into Subset 2a and Subset 2b

Position

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|

Subset 2a (Position 6 = 0x00):
{

| {0x03, | 0x92, | 0x00, | 0x00, | 0x13, | 0x00, | 0x60, | 0x00, | 0x10, | 0x00, | 0x33, | 0x33, | 0x02, | 0x16, | 0x00, | 0x22}, |
|---|---|---|---|---|---|---|---|---|---|---|---|---|---|---|---|
| {0x03, | 0x92, | 0x00, | 0x00, | 0x1a, | 0x00, | 0x80, | 0x00, | 0x10, | 0x00, | 0x33, | 0x33, | 0x02, | 0x16, | 0x00, | 0x20} |
| {0x03, | 0x92, | 0x00, | 0x00, | 0x3a, | 0x00, | 0xd0, | 0x00, | 0x10, | 0x00, | 0x33, | 0x33, | 0x02, | 0x20, | 0x00, | 0x03}, |
| {0x03, | 0x92, | 0x00, | 0x00, | 0x43, | 0x00, | 0xb0, | 0x00, | 0x10, | 0x00, | 0x31, | 0x31, | 0x02, | 0x00, | 0x00, | 0x03}, |
| {0x03, | 0x92, | 0x00, | 0x00, | 0x53, | 0x00, | 0xb0, | 0x00, | 0x10, | 0x00, | 0x31, | 0x11, | 0x02, | 0x00, | 0x00, | 0x03}, |
| {0x03, | 0x92, | 0x00, | 0x00, | 0x60, | 0x00, | 0x40, | 0x01, | 0x10, | 0x00, | 0x33, | 0x33, | 0x02, | 0x6c, | 0x00, | 0x0b}, |
| {0x03, | 0x92, | 0x00, | 0x00, | 0xcb, | 0x00, | 0x60, | 0x02, | 0x10, | 0x00, | 0x33, | 0x33, | 0x02, | 0x10, | 0x00, | 0x03}, |
| {0x03, | 0x92, | 0x01, | 0x00, | 0x3a, | 0x00, | 0x20, | 0x00, | 0x01, | 0x00, | 0x33, | 0x31, | 0x04, | 0x20, | 0x00, | 0x03}, |
| {0x03, | 0x92, | 0x03, | 0x00, | 0x60, | 0x00, | 0x20, | 0x00, | 0x01, | 0x00, | 0x33, | 0x31, | 0x02, | 0x70, | 0x00, | 0x03}, |
| {0x03, | 0x92, | 0x06, | 0x00, | 0x68, | 0x00, | 0x10, | 0x00, | 0x01, | 0x00, | 0x31, | 0x12, | 0x04, | 0x04, | 0x00, | 0x03}, |
| {0x03, | 0x92, | 0x08, | 0x00, | 0x84, | 0x00, | 0x10, | 0x00, | 0x01, | 0x00, | 0x3b, | 0x3b, | 0x02, | 0xe0, | 0x00, | 0x22}, |

}
Subset 2b (Position 6 = 0x01):
{

| {0x03, | 0x92, | 0x00, | 0x00, | 0x62, | 0x01, | 0x90, | 0x02, | 0x10, | 0x00, | 0x33, | 0x33, | 0x02, | 0x10, | 0x00, | 0x03}, |
|---|---|---|---|---|---|---|---|---|---|---|---|---|---|---|---|
| {0x03, | 0x92, | 0x00, | 0x00, | 0xe5, | 0x01, | 0xe0, | 0x04, | 0x10, | 0x00, | 0x33, | 0x33, | 0x02, | 0x40, | 0x00, | 0x03}, |
| {0x03, | 0x92, | 0x0a, | 0x00, | 0x4a, | 0x01, | 0x20, | 0x00, | 0x01, | 0x00, | 0x33, | 0x31, | 0x04, | 0x28, | 0x00, | 0x0a} |

}

Application 102 may analyze subset 2a to determine a wildcarded signature, as described above. Application 102 may determine that the resulting wildcarded signature to be {0x03, 0x92, xx, 0x00, xx, 0x00, xx, xx, xx, 0x00, xx, xx, xx, xx, 0x00, xx} which, if successful, would be the second accepted signature, which is less than the 14, the value selected in this example for the maximum number of signatures allowed, "N." Application 102 may determine that the number of wildcards in the resulting signature is 10, which is greater than the 6, the value selected in this example for the maximum number of wildcards in an accepted signature, "X." Thus, application 102 must divide, process, and analyze subset 2a. Application 102 may continue to recursively or iteratively process subset 2a until it yields the following five accepted signatures that may be used to represent the eleven sequences in subset 2a, as shown in Table 4:

Each of these five signatures meets the requirement in this example that the number of wildcards in a given signature be less than 6. In addition, the determination by application 102 that these five signatures are accepted signatures brings the total number of created accepted signatures to 6, which is less than the maximum 14 allowed in this example. Thus, application 102 may continue processing additional subsets, iteratively, in parallel, or recursively.

Similarly, application 102 may determine that processing and analyzing subset 2b may result in two signatures to represent the three sequences of subset 2b, as shown in Table 5.

TABLE 4

Signatures Resulting from Subset 2a

Position

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|

{

| {0x03, | 0x92, | 0x06, | 0x00, | 0x68, | 0x00, | 0x10, | 0x00, | 0x01, | 0x00, | 0x31, | 0x12, | 0x04, | 0x04, | 0x00, | 0x03}, |
|---|---|---|---|---|---|---|---|---|---|---|---|---|---|---|---|
| {0x03, | 0x92, | 0x08, | 0x00, | 0x84, | 0x00, | 0x10, | 0x00, | 0x01, | 0x00, | 0x3b, | 0x3b, | 0x02, | 0xe0, | 0x00, | 0x22}, |
| {0x03, | 0x92, | xx, | 0x00, | xx, | 0x00, | 0x20, | 0x00, | 0x01, | 0x00, | 0x33, | 0x31, | xx, | xx, | 0x00, | 0x03}, |
| {0x03, | 0x92, | 0x00, | 0x00, | xx, | 0x00, | 0xb0, | 0x00, | 0x10, | 0x00, | 0x31, | xx, | 0x02, | 0x00, | 0x00, | 0x03}, |
| {0x03, | 0x92, | 0x00, | 0x00, | xx, | 0x00, | xx, | xx, | 0x10, | 0x00, | 0x33, | 0x33, | 0x02, | xx, | 0x00, | xx} |

}

TABLE 5

Signatures Resulting from Subset 2b

| Position 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| { | | | | | | | | | | | | | | | |
| {0x03, | 0x92, | 0x00, | 0x00, | xx, | 0x01, | xx, | xx, | 0x10, | 0x00, | 0x33, | 0x33, | 0x02, | xx, | 0x00, | 0x03}, |
| {0x03, | 0x92, | 0x0a, | 0x00, | 0x4a, | 0x01, | 0x20, | 0x00, | 0x01, | 0x00, | 0x33, | 0x31, | 0x04, | 0x28, | 0x00, | 0x0a} |
| } | | | | | | | | | | | | | | | |

Similarly, application 102 may determine that processing and analyzing subset 3 may result in four signatures to represent the fourteen sequences of subset 3, as shown in Table 6.

TABLE 6

Signatures Resulting from Subset 3

| Position 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| { | | | | | | | | | | | | | | | |
| {0x03, | 0x93, | 0x00, | 0x00, | xx, | 0x00, | xx, | xx, | 0x10, | 0x00, | 0x32, | 0x32, | 0x10, | 0x10, | xx, | xx}, |
| {0x03, | 0x93, | 0x00, | 0x00, | xx, | 0x01, | xx, | xx, | 0x10, | 0x00, | 0x32, | 0x32, | 0x10, | xx, | xx, | xx}, |
| {0x03, | 0x93, | 0x00, | 0x00, | xx, | xx, | xx, | xx, | 0x10, | 0x00, | 0x33, | 0x33, | 0x02, | 0x72, | 0x41, | xx}, |
| {0x03, | 0x93, | 0x00, | 0x00, | 0x18, | 0x00, | 0x60, | 0x00, | 0x20, | 0x00, | 0x32, | 0x32, | 0x10, | 0x20, | 0x60, | 0x03} |
| } | | | | | | | | | | | | | | | |

After all subsets have been recursively or iteratively processed, application 102 may have successfully or unsuccessfully created a list of accepted signatures representing example byte sequence set 114. If successful, the list of accepted signatures may comprise invariant byte sequences and wildcards to effectively describe the byte sequence set 114. If unsuccessful, application 102 may have created too many accepted signatures given the operational parameters. In such a case, application 102 may rerun the processing of byte sequence set 114 under adjusted operational parameters, such as varying the values of "N" or "X." Application 102 may rerun such processing automatically. In the above example, application 102 may create twelve accepted signatures comprising invariant byte sequences and wildcards that may describe all twenty-nine sequences from the example byte sequence set 114, as shown in Table 6:

TABLE 6

All Signatures Resulting from Sample Byte Sequence Set

| Position 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| { | | | | | | | | | | | | | | | |
| {0x03, | 0x91, | 0x00, | 0x00, | 0x5c, | 0x00, | 0xf0, | 0x00, | 0x00, | 0x00, | 0x31, | 0x31, | 0x02, | 0x00, | 0x00, | 0x02} |
| {0x03, | 0x92, | 0x06, | 0x00, | 0x68, | 0x00, | 0x10, | 0x00, | 0x01, | 0x00, | 0x31, | 0x12, | 0x04, | 0x04, | 0x00, | 0x03}, |
| {0x03, | 0x92, | 0x08, | 0x00, | 0x84, | 0x00, | 0x10, | 0x00, | 0x01, | 0x00, | 0x3b, | 0x3b, | 0x02, | 0xe0, | 0x00, | 0x22}, |
| {0x03, | 0x92, | xx, | 0x00, | xx, | 0x00, | 0x20, | 0x00, | 0x01, | 0x00, | 0x33, | 0x31, | xx, | xx, | 0x00, | 0x03}, |
| {0x03, | 0x92, | 0x00, | 0x00, | xx, | 0x00, | 0xb0, | 0x00, | 0x10, | 0x00, | 0x31, | xx, | 0x02, | 0x00, | 0x00, | 0x03}, |
| {0x03, | 0x92, | 0x00, | 0x00, | xx, | 0x00, | xx, | xx, | 0x10, | 0x00, | 0x33, | 0x33, | 0x02, | xx, | 0x00, | xx}, |
| {0x03, | 0x92, | 0x00, | 0x00, | xx, | 0x01, | xx, | xx, | 0x10, | 0x00, | 0x33, | 0x33, | 0x02, | xx, | 0x00, | 0x03}, |
| {0x03, | 0x92, | 0x0a, | 0x00, | 0x4a, | 0x01, | 0x20, | 0x00, | 0x01, | 0x00, | 0x33, | 0x31, | 0x04, | 0x28, | 0x00, | 0x0a}, |
| {0x03, | 0x93, | 0x00, | 0x00, | xx, | 0x00, | xx, | xx, | 0x10, | 0x00, | 0x32, | 0x32, | 0x10, | 0x10, | xx, | xx}, |
| {0x03, | 0x93, | 0x00, | 0x00, | xx, | 0x01, | xx, | xx, | 0x10, | 0x00, | 0x32, | 0x32, | 0x10, | xx, | xx, | xx}, |
| {0x03, | 0x93, | 0x00, | 0x00, | xx, | xx, | xx, | xx, | 0x10, | 0x00, | 0x33, | 0x33, | 0x02, | 0x72, | 0x41, | xx}, |
| {0x03, | 0x93, | 0x00, | 0x00, | 0x18, | 0x00, | 0x60, | 0x00, | 0x20, | 0x00, | 0x32, | 0x32, | 0x10, | 0x20, | 0x60, | 0x03} |
| } | | | | | | | | | | | | | | | |

Application 102 may use the list of resulting accepted signatures to generate genericized signatures 118. In one embodiment, a digital entity other than application 102 may be used to transform the list of resulting accepted signatures into genericized signatures 118, or to perform additional operations on genericized signatures 118, such that genericized signatures 118 may be used by antivirus application 202. Such transformations or operations may include adding logic or instructions to indicate the type of malware, location of malware or invariant bytes, or any other step to make the application of genericized signatures 118 practical.

Application 102 may generate report 116 based on the results of processing byte sequence set 114. Report 116 may contain information regarding the signatures that were successfully created, the subsets that were created, or any other information useful to a user of application 102.

Genericized signatures 118 may be transmitted to signature database 112. Upon receipt of new genericized signatures, antivirus application 202 may update its antivirus signatures 210 from antivirus application server 212. Antivirus application 202 may update its signatures at a regularly determined interval, upon notification from antivirus application server 212, after checking for updates from antivirus application server 212, or at any other suitable time. The genericized signatures 118 now incorporated into antivirus signatures 210 may be used to proactively detect new variations of malware that may be encountered by instances of antivirus application 202 scanning electronic devices such as client 204, that were previously unknown, and for which no samples previously existed. Upon detection of malware in client 204, antivirus application 202 may take any suitable corrective action, including removal or containment of the malware. If antivirus application 202 encounters a false positive using an antivirus signature 210 derived from genericized signatures 118, then antivirus application 202 may notify antivirus application server 212 of the false positive detection.

Figure 3:
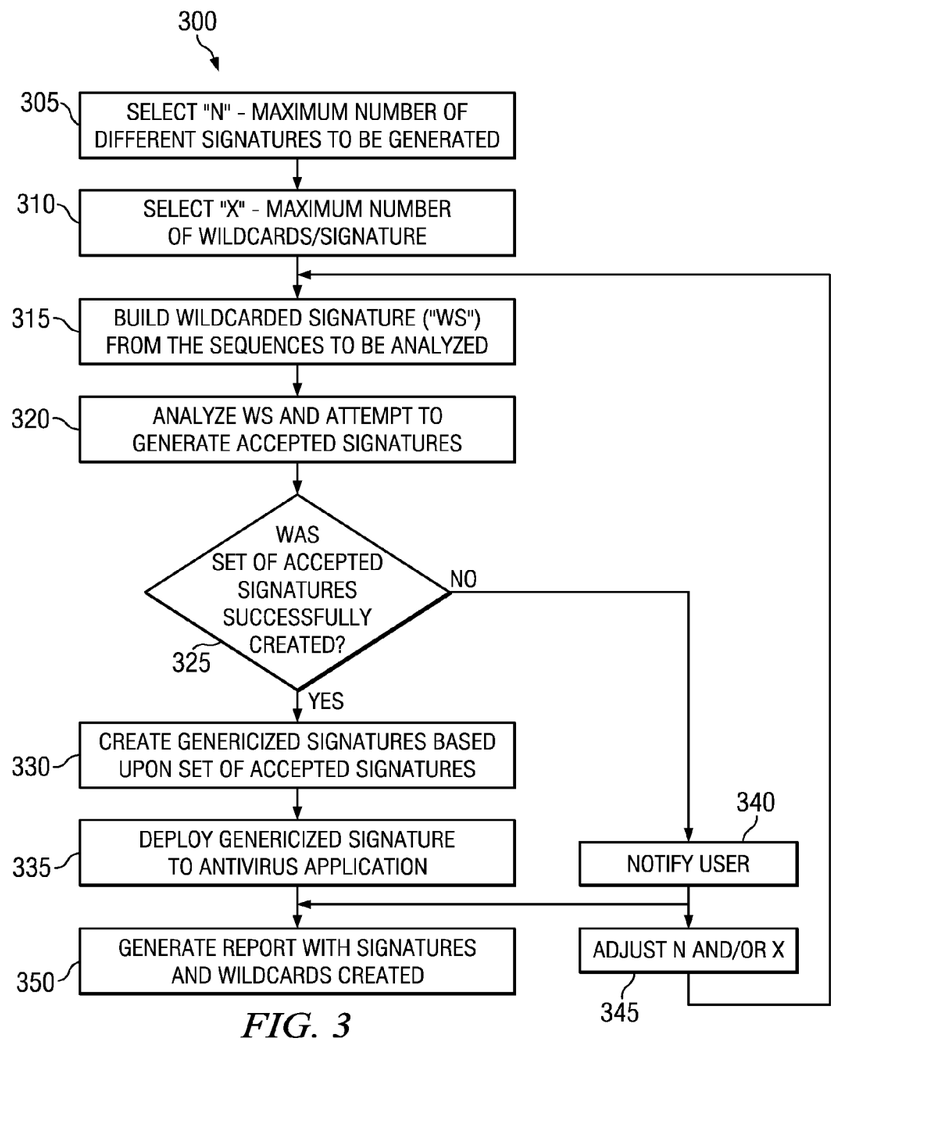
FIG. 3 is an example embodiment of a method for automatically discovering invariant byte sequences for generic malware detections.

FIG. 3 is an example embodiment of a method 300 for automatically discovering invariant byte sequences for generic malware detections. In step 305, a maximum number of different signatures to be generated based on discovered invariant byte sequences may be selected, to be called "N." In step 310, a maximum number of wildcards per signature to be generated may be selected, to be called "X." In step 315, a wildcarded signature "WS" is built from a set of sequences to be analyzed. In the initial exercise of the method, the set of sequences may be derived from a set of malware samples, or hashes of a set of malware samples, to be analyzed to find common identifiers.

Figure 4:
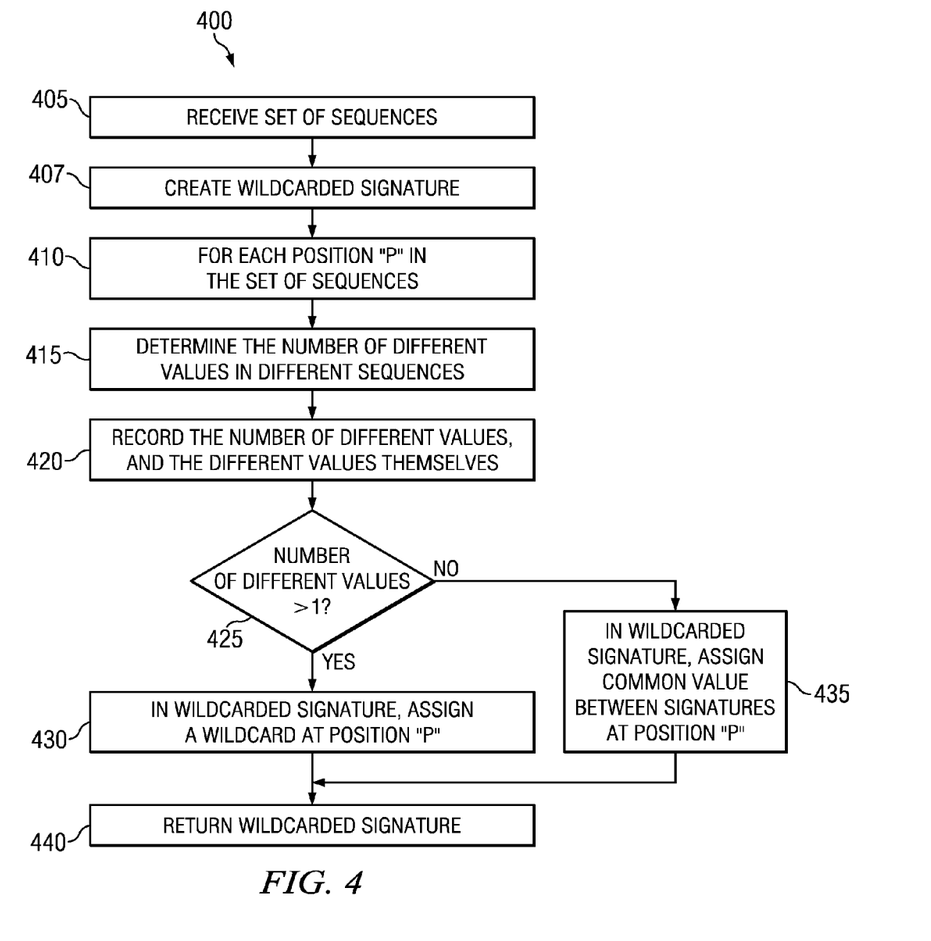
FIG. 4 is an example embodiment of a method for creating a wildcarded signature from a set of sequences.

FIG. 4 is an example embodiment of a method 400 for creating a wildcarded signature from a set of sequences. Step 315 of FIG. 3 may be implemented wholly or in part by method 400. In step 405, a set of sequences for which a wildcarded signature is to be created may be determined or received. In step 407, a corresponding wildcarded signature may be created of the same length as the sequences in the set of sequences. In step 410, for each position "P" in the set of sequences, steps 415-435 may be repeated. In step 415, the number of different values in the set of sequences at position "P" may be determined. The values themselves may also be determined. In step 420, the number of different values and the different values themselves at position "P" across the set of sequences may be recorded. In step 425, it may be determined if there is more than one different value across the different sequences at position "P." If there is more than one different value across the different sequences at position "P," in step 430, a wildcard may be assigned to the wildcarded signature at position "P." If there is only one value across the different sequences at position "P," in step 435, a the value may be assigned to the wildcarded signature at position "P." In step 440, the completed wildcarded signature may be returned, comprising a combination of invariant bytes and wildcards describing the set of sequences analyzed.

Returning to FIG. 3, in step 320 the wildcarded signature and the associated set of sequences may be analyzed to determine whether a set of accepted signatures can be created covering the set of sequences.

Figure 5A:
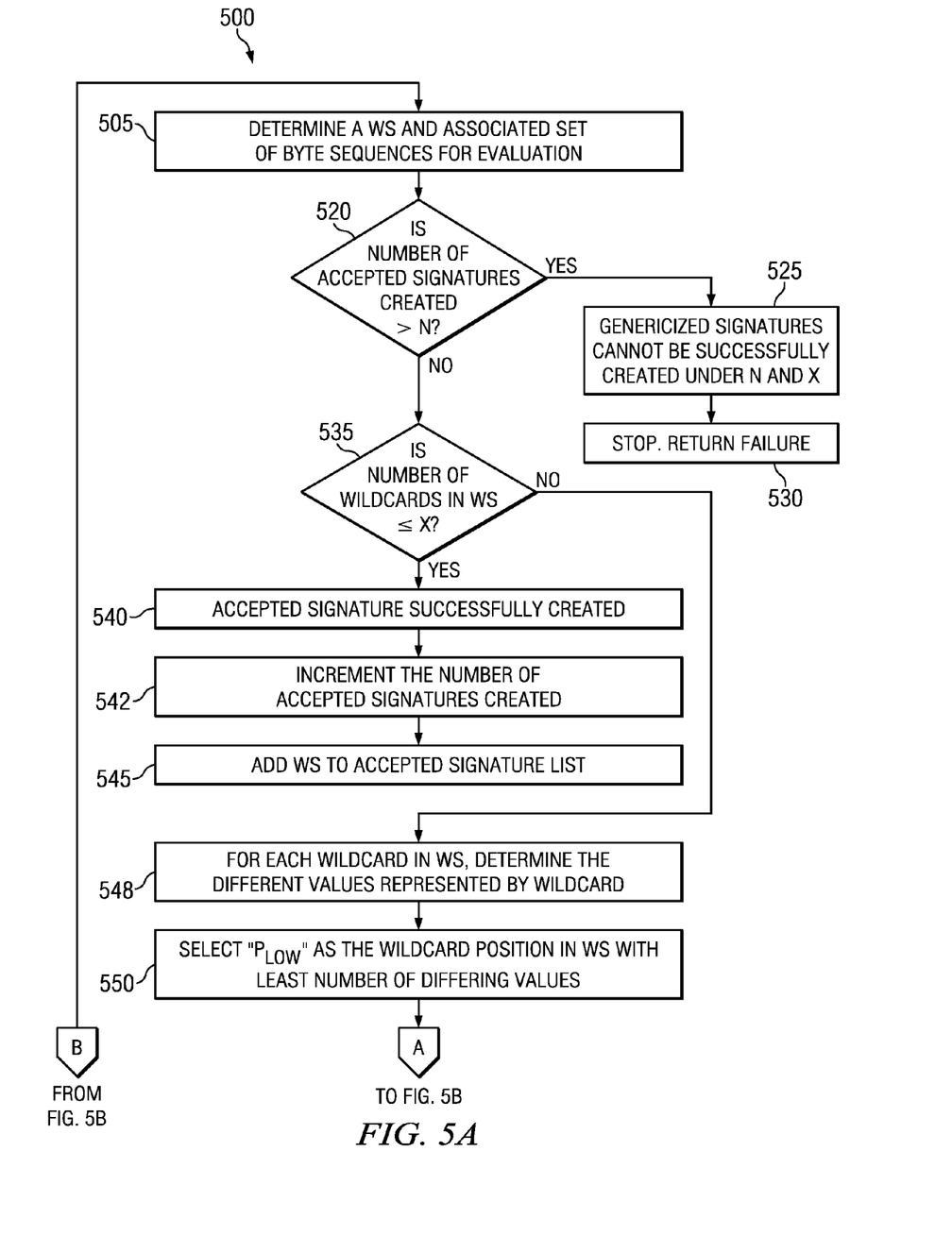
FIG. 5 is an example embodiment of a method for analyzing a wildcarded signature associated with a set of sequences to generate a set of accepted signatures.
Figure 5B:
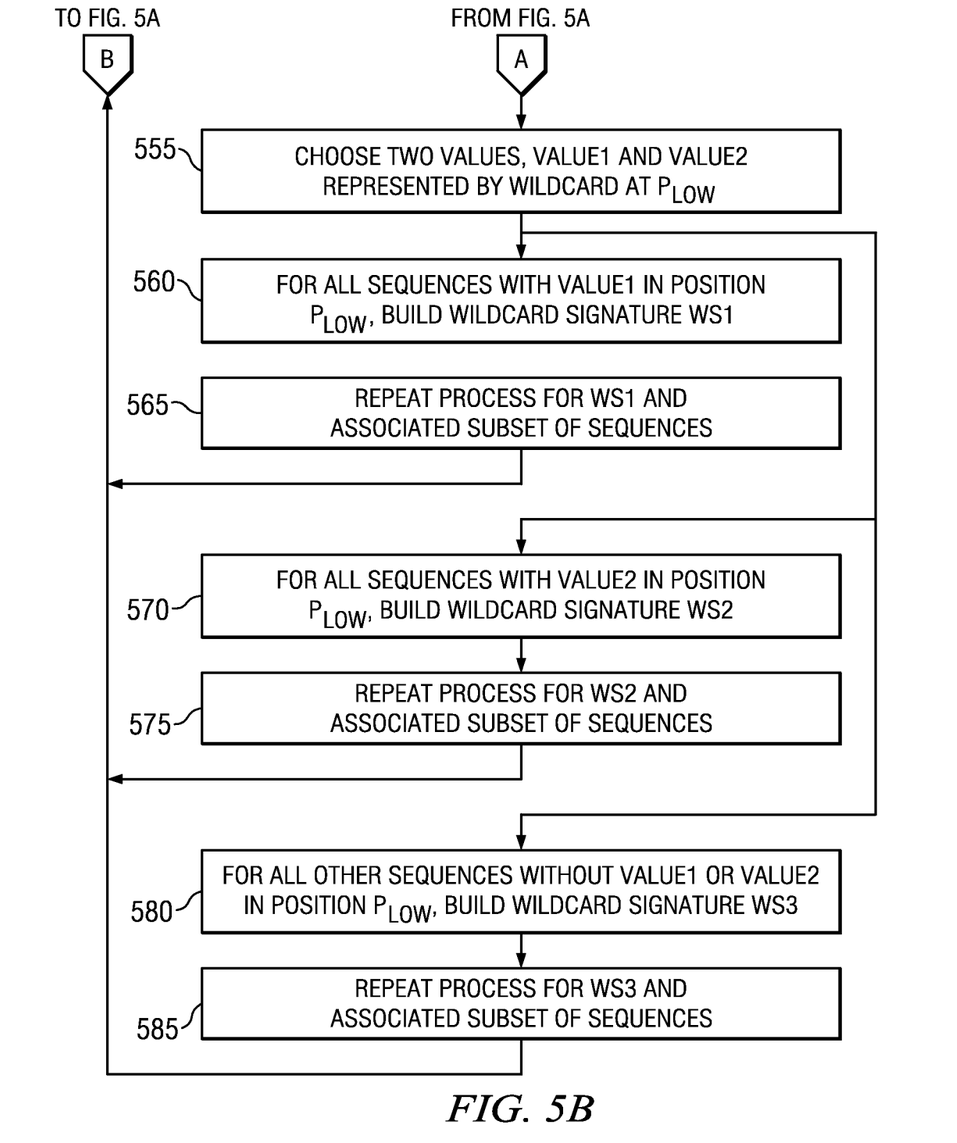

FIG. 5 is an example embodiment of a method 500 for analyzing a wildcarded signature associated with a set of sequences to generate a set of accepted signatures. Step 320 may be implemented wholly or in part by method 500. In step 505, a wildcarded signature and an associated set of byte sequences associated with the wildcarded signature may be determined for evaluation.

In step 520, it may be determined whether or not the number of accepted signatures created—counting the wildcarded signature as an accepted signature—will yield at least on that have been created is greater than "N," the operational limit on how many signatures may be generated. If the number of accepted signatures is greater than N, in step 525 it may be determined that genericized signatures cannot be successfully created under the operational parameters "N" and "X." In step 530, the method may terminate and return an indication of failure to any method making use of method 500. If the number of accepted signatures is less than N, then the method may proceed to analyze the wildcards in the wildcarded signature.

In step 535, the number of wildcards in the wildcarded signature may be determined. If the number of wildcards in the wildcarded signature is less than "X," a maximum number of wildcards permitted for an accepted signature, then in step 540, it may be determined that an accepted signature has been created, in the form of the wildcarded signature, representing the set of byte sequences. In step 542, the number of accepted signatures created may be incremented. In step 545, the wildcarded signature may be added to the list of accepted signatures. In one embodiment, the wildcarded signature may be returned as a result to another method utilizing step 535 or method 500.

If the number of wildcards in the wildcarded signature is greater than "X," then additional processing and analysis may be required by dividing the set of sequences represented by wildcarded signature into subsequences, generating wildcarded signatures based upon these subsequences, and repeating the analysis of the new wildcarded signatures and subsequences. In step 548, for each wildcard in the wildcarded signature associated with a set of byte sequences, the different values across the sequences represented by the wildcard may be determined. In step 550, it may be determined which of the wildcards in the wildcarded signature represents the least number of differing values. The position of such a wildcard may be designated as $P_{LOW}$. In step 555, two of the values represented by the wildcard in position $P_{LOW}$ may be selected. In one embodiment, the values may be selected according to the two values which appear with the least frequency in position $P_{LOW}$ in the set of sequences. The two values may be designated as VALUE1 and VALUE2.

In step 560, a wildcarded signature WS1 may be built, from all the sequences with VALUE1 in position $P_{LOW}$. Step 560 may be implemented wholly or in part by method 400. In step 565, method 500 may be repeated, starting at step 505, for WS1 and the subset of sequences associated with WS1.

In step 570, a wildcarded signature WS2 may be built, from all the sequences with VALUE2 in position $P_{LOW}$. Step 570 may be implemented wholly or in part by method 400. In step 575, method 500 may be repeated, starting at step 505, for WS2 and the subset of sequences associated with WS2.

In step 580, a wildcarded signature WS3 may be built from all other sequences, if any, without VALUE1 or VALUE2 in position $P_{LOW}$. Step 580 may be implemented wholly or in part by method 400. In step 585, method 500 may be repeated, starting at step 505, for the WS3 and the subset of sequences associated with WS1.

Steps 565, 575, and 585 may cause additional exercises of some of steps 505-585. These additional exercises of some of steps 505-585 may be completed before some of the original exercises of some of steps 505-585. Additional exercises of some of steps 505-585 may return values to the original exercises of some of steps 505-585. A person of ordinary skill in the art will recognize how to successfully iteratively, recursively, or in parallel implement these steps and the order of these steps.

Returning to FIG. 3, in step 325, it may be determined whether a set of accepted signatures was generated in step 320. Accepted signatures may have been successfully generated if step 320 yielded a set of no more than "N" different signatures were created, wherein each signature has no more than "X" number of wildcards, and the resulting set of accepted signatures can sufficiently match the set of sequences. If the set of accepted signatures was successfully created, then in step 330 a genericized signature set may be created based upon the set of accepted signatures. In step 335, the genericized signatures may be deployed to an antivirus application. The antivirus application may apply the genericized signatures while scanning an electronic device for malware. The antivirus application may utilize the genericized signatures to detect malware, and subsequently take corrective action on the malware. If the set of accepted signatures was not successfully created, then a user may be notified in step 340. In step 345, the method may be repeated, beginning at step 315. The values for "N" or "X" may be adjusted. The method may be repeated until a set of accepted signatures are successfully created. In step 350, a report may be created, containing the results of the attempt to generate genericized signatures, including information such as signatures and wildcard created, operational parameters, and source data Methods 300, 400, and 500 may be implemented using the system of FIGS. 1-2, or any other system operable to implement methods 300, 400, and 500. As such, the preferred initialization point for methods 300, 400, and 500 and the order of the steps comprising methods 300, 400, and 500 may depend on the implementation chosen. In some embodiments, some steps may be optionally omitted, repeated, or combined. Some or all of methods 300, 400, and 500 may be implemented in a recursive or iterative manner, or a mixture thereof. In certain embodiments, methods 300, 400, and 500 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other tangible, non-transitory media; and/or any combination of the foregoing.

Although the present disclosure has been described in detail, it should be understood that various changes, substitutions, and alterations can be made hereto without departing from the spirit and the scope of the disclosure as defined by the appended claims.

What is claimed is:

1. A method for creating a set of genericized signatures for detection of byte sequences in computer code, comprising:
accessing a first set of sample signatures from a malware database, each of the first set of sample signatures corresponding to an instance of malware; determining a maximum number of wildcards that a wildcarded signature may comprise; determining a first wildcarded signature corresponding to the first set of sample signatures; evaluating by a microprocessor the first wildcarded signature, the evaluating further comprising:
if a number of wildcards in the first wildcarded signature exceeds the maximum number of wildcards, determining a plurality of second wildcarded signatures corresponding to a plurality of subsets of the set of sample signatures; and
if the number of wildcards in the first wildcarded signature is less than or equal to the maximum number of wildcards, adding the first wildcarded signature to a set of genericized signatures; and repeating the evaluating wherein each of the second wildcarded signatures is respectively used in place of the first wildcarded signature.

2. The method of claim 1, further comprising:
determining a maximum number of genericized signatures in the set of genericized signatures;
if adding a wildcarded signature to the set of genericized signatures would exceed the maximum number of genericized signatures in the set, determining that an acceptable set of genericized signatures cannot be created for the first set of sample signatures.

3. The method of claim 1, wherein determining a wildcarded signature corresponding to a set of signatures comprises:
for each position in the signatures in the set of signatures:
if a number of different values for a position in the set of signatures is greater than one, assigning a wildcard to the position for the wildcarded signature;
if the position in the set of signatures has one value, assigning the value to a corresponding position for the wildcarded signature.

4. The method of claim 1, further comprising: choosing a plurality of subsets including:
selecting a position in the signatures in the set of signatures for which the signatures have the least variation; and
choosing a first subset of the set of signatures, the first subset comprising signatures of the set of signatures with at least some values in common at the position.

5. The method of claim 4, wherein the first subset comprises the signatures of the set of signatures with the least number of values in common at the position.

6. The method of claim 4, wherein choosing a plurality of subsets further comprises choosing a second subset of the set of signatures, the second subset comprising signatures of the set of signatures with values in common at the position.

7. The method of claim 6, wherein the second subset comprises the signatures of the set of signatures with the second least number of values in common at the position.

8. The method of claim 6, wherein choosing a plurality of subsets further comprises choosing a third subset of the set of signatures, the third subset comprising signatures not included in the first or second subsets.

9. The method of claim 2, further comprising:
if it is determined that an acceptable set of genericized signatures cannot be created for the first set of sample signatures, repeating the steps of claim 2 with an increased maximum number of genericized signatures.

10. The method of claim 2, further comprising:
if it is determined that an acceptable set of genericized signatures cannot be created for the first set of sample signatures, repeating the steps of claim 2 with an increased maximum number of wildcards that a wildcarded signature may comprise.

11. An article of manufacture, comprising: a non-transitory computer readable medium accessible to a processor
wherein processor-executable instructions are stored on the non-transitory computer readable medium, the instructions, when executed by the processor, cause the processor to:
create a set of genericized signatures for detection of byte sequences in computer code;
access a first set of sample signatures, each of the signatures corresponding to an instance of malware;
determine a maximum number of wildcards that a wildcarded signature may comprise;
determine a first wildcarded signature corresponding to the first set of sample signatures;
evaluate the first wildcarded signature, including instructions to cause the processor to:

if a number of wildcards in the first wildcarded signature exceeds the maximum number of wildcards, determine a plurality of second wildcarded signatures corresponding to a plurality of subsets of the set of sample signatures; and if the number of wildcards in the first wildcarded signature is less than or equal to the maximum number of wildcards, add the first wildcarded signature to the set of genericized signatures; and repeat the instructions to evaluate, wherein each of the second wildcarded signatures is respectively used in place of the first wildcarded signature.

12. The article of claim 11, further comprising instructions to cause the processor to:

determine a maximum number of genericized signatures in the set of genericized signatures;

if adding a wildcarded signature to the set of genericized signatures would exceed the maximum number of genericized signatures in the set, determine that an acceptable set of genericized signatures cannot be created for the first set of sample signatures.

13. The article of claim 11, wherein the instructions to cause the processor to determine a wildcarded signature corresponding to a set of signatures include instructions to cause the processor to:

for each position in the signatures in the set of signatures:
if a number of different values for a position in the set of signatures is greater than one, assign a wildcard to the position for the wildcarded signature;
if the position in the set of signatures has one value, assign the value to a corresponding position for the wildcarded signature.

14. The article of claim 11, further comprising instructions to cause the processor to choose a plurality of subsets, including instructions to cause the processor to:

select a position in the signatures in the set of signatures for which the signatures have the least variation; and choose a first subset of the set of signatures, the first subset comprising signatures of the set of signatures with at least some values in common at the position.

15. The article of claim 14, wherein the first subset comprises the signatures of the set of signatures with the least number of values in common at the position.

16. The article of claim 14, wherein the instructions to cause the processor to choose a plurality of subsets further comprise instructions to cause the processor to choose a second subset of the set of signatures, the second subset comprising signatures of the set of signatures with values in common at the position.

17. The article of claim 16, wherein the second subset comprises the signatures of the set of signatures with the second least number of values in common at the position.

18. The article of claim 17, wherein the instructions to cause the processor to choose a plurality of subsets further comprise instructions to cause the processor to choose a third subset of the set of signatures, the third subset comprising signatures not included in the first or second subsets.

19. A system for determining a set of genericized signatures, comprising:

a processor having access to a non-transitory computer readable medium, wherein processor-executable instructions are stored on the computer readable medium, the instructions, when executed by the processor, cause the processor to:

create a set of genericized signatures for detection of byte sequences in computer code;

access a first set of sample signatures, each of the signatures corresponding to an instance of malware;

determine a maximum number of wildcards that a wildcarded signature may comprise;

determine a first wildcarded signature corresponding to the first set of sample signatures;

evaluate the first wildcarded signature, including instructions to cause the processor to:
if a number of wildcards in the first wildcarded signature exceeds the maximum number of wildcards, determine a plurality of second wildcarded signatures corresponding to a plurality of subsets of the set of sample signatures; and
if the number of wildcards in the first wildcarded signature is less than or equal to the maximum number of wildcards, add the first wildcarded signature to the set of genericized signatures; and repeat the instructions to evaluate, wherein each of the second wildcarded signatures is respectively used in place of the first wildcarded signature.

20. The system of claim 19, further comprising instructions to cause the processor to:

determine a maximum number of genericized signatures in the set of genericized signatures;

if adding a wildcarded signature to the set of genericized signatures would exceed the maximum number of genericized signatures in the set, determine that an acceptable set of genericized signatures cannot be created for the first set of sample signatures.

21. The system of claim 19, wherein the instructions to cause the processor to determine a wildcarded signature corresponding to a set of signatures include instructions to cause the processor to:

for each position in the signatures in the set of signatures:
if a number of different values for a position in the set of signatures is greater than one, assign a wildcard to the position for the wildcarded signature;
if the position in the set of signatures has one value, assign the value to a corresponding position for the wildcarded signature.

22. The system of claim 19, further comprising instructions to cause the processor to choose a plurality of subsets, including instructions to cause the processor to:

select a position in the signatures in the set of signatures to be divided into subsets for which the signatures have the least variation; and choose a first subset of the set of signatures, the first subset comprising signatures of the set of signatures with values in common at the position.

23. The system of claim 22, wherein the first subset comprises the signatures of the set of signatures with the least number of values in common at the position.

24. The system of claim 22, wherein the instructions to cause the processor to choose a plurality of subsets further comprise instructions to cause the processor to choose a second subset of the set of signatures, the second subset comprising signatures of the set of signatures with values in common at the position.

25. The system of claim 24, wherein the second subset comprises the signatures of the set of signatures with the second least number of values in common at the position.

26. The system of claim 25, wherein the instructions to cause the processor to choose a plurality of subsets further comprise instructions to cause the processor to choose a third subset of the set of signatures, the third subset comprising signatures not included in the first or second subsets.

* * * * *